Patented Feb. 5, 1935

1,990,433

UNITED STATES PATENT OFFICE 1,990,433

MANUFACTURE OF HIGHLY ESTERIFIED SOLUBLE MIXED CELLULOSE ESTERS

Jan Gerard Jurling, The Hague, Netherlands, assignor to Naamlooze Vennootschap Fabriek van Chemische Producten, Schiedam, Netherlands, a company of the Netherlands No Drawing. Application April 24, 1931, Serial No. 532,712

5 Claims. (Cl. 260—101)

In my application Serial No. 381,091 of July 25th, 1929, I have disclosed a process for the manufacture of stable acetyl nitro-cellulose with a total degree of esterification of more than 90%, in which nitro-cellulose is acetylated with a sulphuric acid catalyst until a total degree of esterification of more than 90% has been reached and the then obtained product is allowed to stand dissolved in substantially 100% acetic acid without any acetic anhydride. In said specification the degree of esterification is defined as the percentage of the 3 esterifiable OH groups in cellulose ($C_6H_{10}O_5$) which is actually esterified.

To calculate this degree from the results of analysis one has to calculate the original OH present and the esterified OH, for instance in 100 parts by weight of the ester. If $p$ is the weight of original cellulose from which 100 parts by weight of the ester are derived, the original quantity of esterifiable OH will be $$p\frac{3\times17}{162}$$

In order to calculate $p$ it should be noted that acetylating causes 17 parts by weight of OH to be replaced by 59 parts $OOCCH_3$, causing an increase in weight of 42 parts. If the analysis of the ester states the acetyl content as acetic acid, every 60 parts of acetic acid will correspond therefore with an increase in weight of 42 parts of the original cellulose.

Similarly every 14 parts of N found in the ester indicate the presence of a $ONO_2$ group, having been substituted for an OH group with an increase in weight of $62-17=45$ parts. Thus it will be realized that for every 60 parts of acetic acid found by analysis in the acetylated nitro cellulose, the weight of the original cellulose has been increased 42 parts by the esterification, and for every 62 parts of $ONO_2$ or 14 parts of nitrogen found, the weight of the original cellulose has been increased 45 parts by the esterification. Now, to find the weight of the original cellulose used to produce 100 parts of acetylated nitro cellulose, it is necessary to subtract from 100 the value obtained by multiplying 42 by the weight of acetic acid found divided by 60, and to subtract the value obtained by multiplying 45 by the weight of nitrogen found divided by 14. If the acetic acid content is $a$ and the N content $b$, $p$ will be $$100-\left(\frac{a}{60}42+\frac{b}{14}\times45\right)$$

I further have to calculate the quantity of esterified OH. 60 parts of acetic acid or 14 parts of N correspond to 17 parts of esterified OH. The degree of esterification therefore is:

$$\frac{\left(\frac{a}{60}+\frac{b}{14}\right)17}{\left[100-\left(\frac{a}{60}42+\frac{b}{14}45\right)\right]\frac{3\times17}{162}}=$$

$$\frac{\left(\frac{a}{60}+\frac{b}{14}\right)54}{100-\left(\frac{a}{60}42+\frac{b}{14}45\right)}$$

For instance, if a mixed ester contains 54.36% of acetic acid and 1.38% of nitrogen, the degree of esterification will be $$\frac{\left(\frac{54.36}{60}+\frac{1.38}{14}\right)54}{100-\left(\frac{54.36}{60}42+\frac{1.38}{14}45\right)}=94.4\%$$

In my specification Serial Number 381,091 I have disclosed and claimed specifically mixed esters with a very high degree of esterification of more than 93%. The higher the degree of esterification, the better the waterproof qualities of the products are. I have also disclosed that these highly esterified and stable mixed cellulose esters are soluble in acetone, provided that the acetyl content, calculated as acetic acid, is below 56%. The films made from an acetone solution of this highly esterified nitroacetylcellulose have a very good tensile strength and their waterproof qualities are exceptional. The only draw-back of these films is that they are not so clear and brilliant as those made out of nitrocellulose. The object of the present invention is to alter slightly the quality of the product obtained according to my application 381,091, so that perfectly clear films can be obtained from the acetone solution. In order to obtain this effect I subject these products, before or after separating them from the original solution, to a slight hydrolysis.

Hydrolysis of primary nitro-acetyl cellulose is a well-known process. It is commonly effected by adding to the primary solution a small amount of water or the like and leaving the solution for a period to itself, but may also take place after other well-known methods.

The hydrolysis or saponification according to this process causes a decrease of acetyl content and a change in solubilities, in the first place an increased solubility in acetone. According to known processes a primary solution of nitro-acetyl cellulose, which always contains sulphuric acid bound to the cellulose, was subjected to hydrolysis. In this case stable products cannot be obtained before all the sulphuric acid is removed from the cellulose molecule. In ordinary hydrolysis this process of removing sulphuric acids proceeds rather slowly, so that it was impossible to limit the hydrolysis to any definite point, but in order to obtain stable products it was required to proceed with the hydrolysis to such an extent that a substantial decrease of the degree of esterification was unavoidable. This is avoided according to the present invention because in the first step of the process the sulphuric acid is removed entirely from the cellulose molecule without any decrease of degree of esterification. Only then the necessary water (which may be a very small quantity) is added to obtain hydrolysis. This hydrolysis can now be stopped at any point and may proceed only to the small extent necessary to obtain the desired quality, with only a very small decrease in degree of esterification. The invention, however, is not limited to any degree of hydrolysis or to any kind of hydrolysis, but broadly claims the idea of first subjecting the primary solution of a nitro-acetyl cellulose to standing dissolved in substantially 100% acetic acid, without any acetic anhydride, until the sulphuric acid in the esterified cellulose molecule has been substituted by acetic acid and then subjecting the solution to a hydrolysis.

The best products are obtained from highly esterified nitroacetyl cellulose, with a degree of esterification of about 94% or higher by carrying out the hydrolysis in such a manner that the desired effect is reached, which may be obtained already by a small decrease of the degree of esterification.

Example 107 kg. nitrocellulose with a nitrogen content of 2.2% are acetylated in a mixture of 225 kg. acetic anhydride, 335 kg. acetic acid and 8 kg. sulphuric acid. The temperature during the addition of the nitrocellulose is kept between 20 and 25° and the acetylation is continued at about 20° C. After the acetylation is completed a sample of the product showed on analyzing the following result:

|  | Percent |
|---|---|
| Acetic acid | 51.5 |
| $H_2SO_4$ | 3.50 |
| $N_2$ | 1.45 |

The product is absolutely unstable because of the sulphuric acid content. To the solution just the amount of water was added to paralyze the action of the acetic anhydride. As no excess of water was added no hydrolysis took place. After 3 hours standing at about 35° a product was obtained containing:

|  | Percent |
|---|---|
| Acetic acid | 54.80 |
| $H_2SO_4$ | 0.07 |
| $N_2$ | 1.43 |

The degree of esterification is 96.1%, substantially the same as that of the primary product. The product is absolutely stable, soluble in acetone but the films made from this solution are not quite clear.

Now to the solution 15 kg. of water is added and the thus obtained solution subjected to a slight hydrolysis at a temperature af about 35° C. After 8 hours the product was analyzed and proved to contain:

| Acetic acid | 53.77 percent |
|---|---|
| $N_2$ | 1.45 percent |
| $H_2SO_4$ | traces |

The degree of esterification being 94.8%, the product has good waterproof qualities and on evaporating the acetone solution, the yielded films are quite clear.

It is obvious that the hydrolysis might have been continued more than 8 hours and that after this method, every degree of esterification can be obtained, producing always quite stable products.

What I claim is:—

1. A process of producing stable acetyl nitro cellulose, consisting in acetylating nitro cellulose with acetic anhydride, acetic acid as a solvent, and a sulphuric acid catalyst until a total degree of esterification of more than 90% has been reached, hydrolyzing the excess of acetic anhydride without diluting the acetic acid, allowing the product to stand dissolved in 100% acetic acid without any acetic anhydride until the sulphuric acid in the esterified cellulose molecule has been substituted by acetic acid without any decrease in the degree of esterification, and then subjecting it to a slight hydrolysis which does not reduce the degree of esterification more than 2%.

2. A process of producing stable acetyl nitro cellulose, consisting in acetlylating nitro cellulose with acetic anhydride, acetic acid as a solvent, and a sulphuric acid catalyst until a total degree of esterification of more than 93% has been reached, hydrolyzing the excess of acetic anhydride without diluting the acetic acid, allowing the product to stand dissolved in 100% acetic acid without any acetic anhydride until the sulphuric acid in the esterified cellulose molecule has been substituted by acetic acid without any decrease in the degree of esterification, and then subjecting it to a hydrolysis until films made of the acetone solution are perfectly clear.

3. A process of producing stable acetyl nitro cellulose, consisting in acetylating nitro cellulose with acetic anhydride, acetic acid as a solvent, and a sulphuric acid catalyst until a total degree of esterification of more than 93% has been reached, killing the excess of anhydride without diluting the acetic acid, allowing the mixture to stand until the sulphuric acid in the esterified cellulose molecule has been substituted by acetic acid without any decrease in the degree of esterification, and then subjecting the product to a slight hydrolysis which does not reduce the degree of esterification more than 2%.

4. The process of producing stable acetyl nitro cellulose as set forth in claim 3, wherein the slight hydrolysis is effected by adding a small quantity of water to the solution of the stabilized ester, and allowing the mixture to stand.

5. A process of producing stable acetyl nitro cellulose, consisting in acetylating a nitro cellulose containing less than 3% nitrogen with acetic anhydride, acetic acid as a solvent and a sulphuric acid catalyst until a total degree of esterification of more than 93% has been reached, converting the excess of anhydride into acetic acid without diluting the acetic acid, allowing the mixture to stand until the sulphuric acid in the esterified cellulose molecule has been substituted by acetic acid without any decrease in the degree of esterification, and then subjecting the product to a slight hydrolysis which does not reduce the degree of esterification more than 2%.

JAN GERARD JURLING.